United States Patent
Williams, Jr. et al.

(10) Patent No.: US 8,112,584 B1
(45) Date of Patent: Feb. 7, 2012

(54) STORAGE CONTROLLER PERFORMING A SET OF MULTIPLE OPERATIONS ON CACHED DATA WITH A NO-MISS GUARANTEE UNTIL ALL OF THE OPERATIONS ARE COMPLETE

(75) Inventors: John J. Williams, Jr., Pleasanton, CA (US); John Andrew Fingerhut, Aliso Viejo, CA (US); Man Kit Tang, Saratoga, CA (US); Barry Scott Burns, Cary, NC (US)

(73) Assignee: Cisco Technology, Inc, San Jose, CA (US)

( * ) Notice: Subject to any disclaimer, the term of this patent is extended or adjusted under 35 U.S.C. 154(b) by 604 days.

(21) Appl. No.: 10/878,891

(22) Filed: Jun. 28, 2004

(51) Int. Cl.
  *G06F 12/00* (2006.01)
  *G06F 12/12* (2006.01)
(52) U.S. Cl. .................. 711/118; 711/154; 711/155
(58) Field of Classification Search .................. 711/118, 711/154, 155
See application file for complete search history.

(56) References Cited

U.S. PATENT DOCUMENTS

| | | | |
|---|---|---|---|
| 5,179,660 A * | 1/1993 | Devany et al. ................. 709/219 |
| 5,375,216 A * | 12/1994 | Moyer et al. ................... 711/123 |
| 5,430,860 A | 7/1995 | Capps, Jr. et al. |
| 5,530,851 A | 6/1996 | Fortier |
| 5,555,405 A | 9/1996 | Griesmer et al. |
| 5,613,071 A * | 3/1997 | Rankin et al. ......................... 1/1 |
| 5,627,992 A * | 5/1997 | Baror ............................ 711/133 |
| 5,974,508 A * | 10/1999 | Maheshwari ................ 711/133 |
| 6,038,651 A * | 3/2000 | VanHuben et al. ............ 712/21 |
| 6,044,439 A * | 3/2000 | Ballard et al. ................. 711/137 |
| 6,370,625 B1 | 4/2002 | Carmean et al. |
| 6,434,639 B1 * | 8/2002 | Haghighi ........................ 710/39 |
| 6,449,697 B1 * | 9/2002 | Beardsley et al. ............. 711/137 |
| 6,484,185 B1 * | 11/2002 | Jain et al. ....................... 707/203 |
| 6,502,205 B1 * | 12/2002 | Yanai et al. ........................ 714/7 |
| 6,697,960 B1 * | 2/2004 | Clark et al. ...................... 714/15 |
| 6,715,046 B1 | 3/2004 | Shoham et al. |

(Continued)

OTHER PUBLICATIONS

A.S. Tanenbaum. Structured Computer Organization. 1984. Prentice Hall Inc. 2nd ed. pp. 10-12.*
Markatos and Katavenis, Telegraphos: High-Performance Networking for Parallel Processing on Workstation Clusters, High-Performance Computer Architecture, Proceedings, International Symposium on, Feb. 3-7, 1996, pp. 144-153, San Jose, CA.

*Primary Examiner* — Yaima Campos
*Assistant Examiner* — Samuel Dillon
(74) *Attorney, Agent, or Firm* — The Law Office of Kirk D. Williams

(57) ABSTRACT

Disclosed are, inter alia, methods, apparatus, data structures, computer-readable media, mechanisms, and means for a storage controller (e.g., memory controller, disk controller, etc.) performing a set of multiple operations on cached data with a no-miss guarantee until the multiple operations are complete, which may, for example, be used by a packet processor to quickly update multiple statistics values (e.g., byte, packet, error counts, etc.) based on processed packets. Operations to be performed on data at the same address and/or in a common data structure are grouped together and burst so that they arrive at the storage system in contiguous succession for the storage controller to perform. By not allowing the storage controller to flush the data from its cache until all of the operations are performed, even a tiny cache attached to the storage controller can reduce the bandwidth and latency of updating the data.

43 Claims, 7 Drawing Sheets

U.S. PATENT DOCUMENTS

| | | |
|---|---|---|
| 6,934,877 B2 * | 8/2005 | Tamatsu .............................. 714/5 |
| 6,956,578 B2 | 10/2005 | Kuo et al. |
| 7,020,743 B2 * | 3/2006 | Lee et al. ....................... 711/113 |
| 7,165,143 B2 * | 1/2007 | Klein ............................. 711/118 |
| 7,280,548 B2 * | 10/2007 | Sampath et al. .............. 370/401 |
| 7,302,425 B1 * | 11/2007 | Bernstein et al. ..................... 1/1 |
| 7,346,917 B2 * | 3/2008 | Gatto et al. ........................ 725/5 |
| 2004/0250029 A1 * | 12/2004 | Ji et al. ........................... 711/162 |
| 2005/0086446 A1 * | 4/2005 | McKenney et al. ........... 711/163 |
| 2009/0276577 A1 * | 11/2009 | Bell ............................... 711/137 |

* cited by examiner

STORAGE CONTROLLER PERFORMING A SET OF MULTIPLE OPERATIONS ON CACHED DATA WITH A NO-MISS GUARANTEE UNTIL ALL OF THE OPERATIONS ARE COMPLETE

TECHNICAL FIELD

One embodiment of the invention relates to communications and computer systems and other devices; and more particularly, one embodiment relates to a storage controller (e.g., memory controller, disk controller, etc.) performing a set of multiple operations on cached data with a no-miss guarantee until the multiple operations are complete, which may, for example, be used by a packet processor to quickly update multiple statistics values (e.g., byte, packet, error counts, etc.) based on processed packets.

BACKGROUND

For a multiprocessor system it may be necessary to perform multiple atomic operations on a small data structure. Traditionally caches are used to reduce bandwidth and latency for modifying multiple fields. Many processors have operations that either perform atomic operations or can acquire locks for performing operations atomically. These are not suitable for high performance critical code sections. In general, the known prior approach is to devote a processor for doing this specific operation and have other processors send messages to it. If the data structure is copied into a local cache, the latency for transferring the data is visible to any other processors waiting for atomic access to that data structure. If the atomic operations are dispatched to the memory system individually, then the latency of sending each operation is visible to the processor and the bandwidth to the memory system is increased. Wanted is a method for reducing the cost of updating data structures. Note, nothing described or referenced in this document is admitted as prior art to this application unless explicitly so stated.

SUMMARY

Disclosed are, inter alia, methods, apparatus, data structures, computer-readable media, mechanisms, and means for a storage controller (e.g., memory controller, disk controller, etc.) performing a set of multiple operations on cached data with a no-miss guarantee until the multiple operations are complete, which may, for example, be used by a packet processor to quickly update multiple statistics values (e.g., byte, packet, error counts, etc.) based on processed packets. In one embodiment, operations to be performed on data at the same address and/or in a common data structure are grouped together and burst so that they arrive at the storage system in contiguous succession for the storage controller to perform. By not allowing the storage controller to flush the data from its cache until all of the operations are performed, even a tiny cache attached to the storage controller can reduce the bandwidth and latency of updating the data.

One embodiment includes a storage and a storage controller. The storage controller includes a processing element and cache, with the cache including storage for one or more cache lines. The storage controller is configured to receive and process batch commands including a batch command, which includes indications of multiple operations to be performed on data that can be stored in one or more cache lines. The storage controller is configured to retrieve the data into one or more particular cache lines of the cache from said storage in response to a cache miss for the batch command, and configured to perform all of the multiple operations before any other access request to said storage including another batch command such that the plurality of operations excluding the first operation are guaranteed to be performed without generating a cache miss.

In one embodiment, the cache miss for the batch command includes a cache miss operation in response to preparing to perform the first of the plurality of operations on said data. In one embodiment, at least one of the operations includes a read-modify-write operation. In one embodiment, the data can be stored in a single cache line, and the one or more particular cache lines consists of a single particular cache line. In one embodiment, the storage includes one or more memory devices and the storage controller includes a memory controller. In one embodiment, each of the plurality of operations manipulates a different subset of the data. In one embodiment, the storage controller is configured to receive the batch command from a packet processor, and said data corresponds to packet processing data. In one embodiment, the packet processing data includes packet-based statistics (e.g., packet, byte, protocol, error counts, etc.). In one embodiment, the storage controller is configured such that it must perform all of the plurality of operations included in the batch command after performing a first operation of the plurality of operations prior to performing any other operation on data stored in the cache memory. In one embodiment, the storage controller is configured to perform all operations indicated in the batch command prior to executing any operations indicated in a pending second batch command.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DETAILED DESCRIPTION

Figure 1A:
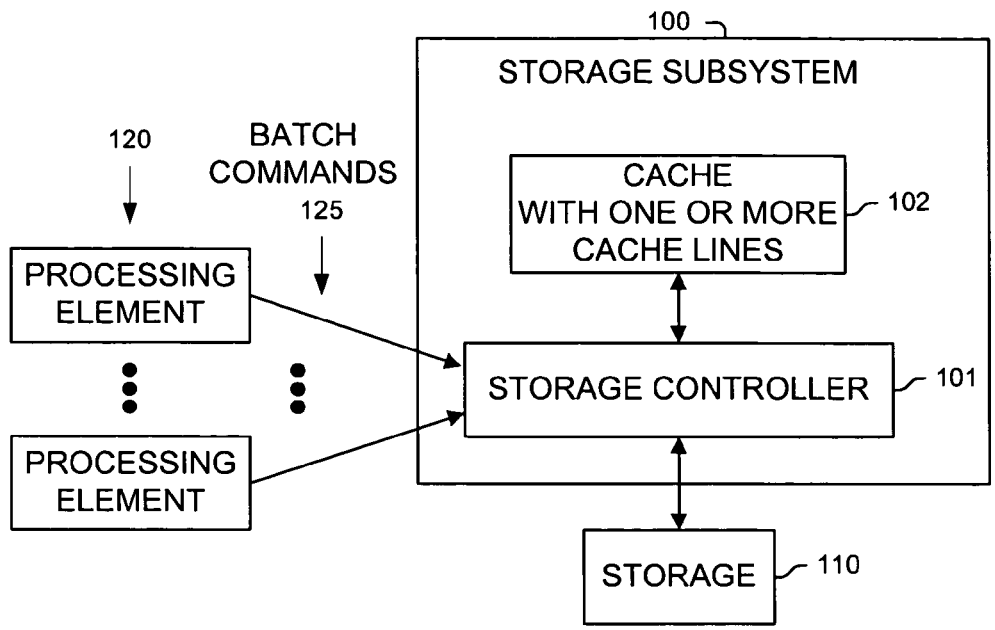
FIG. 1A is a block diagram of a storage system used in one embodiment.

Disclosed are, inter alia, methods, apparatus, data structures, computer-readable media, mechanisms, and means for a storage controller (e.g., memory controller, disk controller, etc.) performing a set of multiple operations on cached data with a no-miss guarantee until the multiple operations are complete, which may, for example, be used by a packet processor to quickly update multiple statistics values (e.g., byte, packet, error counts, etc.) based on processed packets.

Embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. The embodiments described hereinafter embody various aspects and configurations within the scope and spirit of the invention, with the figures illustrating exemplary and non-limiting configurations. Note, computer-readable media and means for performing methods and processing block operations are disclosed and are in keeping with the extensible scope and spirit of the invention.

As used herein, the term "packet" refers to packets of all types or any other units of information or data, including, but not limited to, fixed length cells and variable length packets, each of which may or may not be divisible into smaller packets or cells. The term "packet" as used herein also refers to both the packet itself or a packet indication, such as, but not limited to all or part of a packet or packet header, a data structure value, pointer or index, or any other part or direct or indirect identification of a packet or information associated therewith. For example, often times a router operates on one or more fields of a packet, especially the header, so the body of the packet is often stored in a separate memory while the packet header is manipulated, and based on the results of the processing of the packet (i.e., the packet header in this example), the entire packet is forwarded or dropped, etc. Additionally, these packets may contain one or more types of information, including, but not limited to, voice, data, video, and audio information. The term "item" is used generically herein to refer to a packet or any other unit or piece of information or data, a device, component, element, or any other entity. The phrases "processing a packet" and "packet processing" typically refer to performing some steps or actions based on the packet contents (e.g., packet header or other fields), and such steps or action may or may not include modifying, storing, dropping, and/or forwarding the packet and/or associated data.

The term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processing elements and systems, control logic, ASICs, chips, workstations, mainframes, etc. The term "processing element" is used generically herein to describe any type of processing mechanism or device, such as a processor, ASIC, field programmable gate array, computer, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process the value—the value must be obtained prior to processing it, although some of the associated processing may be performed prior to, concurrently with, and/or after the read operation). Furthermore, the term "identify" is used generically to describe any manner or mechanism for directly or indirectly ascertaining something, which may include, but is not limited to receiving, retrieving from memory, determining, defining, calculating, generating, etc.

Moreover, the terms "network" and "communications mechanism" are used generically herein to describe one or more networks, communications media or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc. The term "message" is used generically herein to describe a piece of information which may or may not be, but is typically communicated via one or more communication mechanisms of any type.

The term "storage mechanism" includes any type of memory, storage device or other mechanism for maintaining instructions or data in any format. "Computer-readable medium" is an extensible term including any memory, storage device, storage mechanism, and other storage and signaling mechanisms including interfaces and devices such as network interface cards and buffers therein, as well as any communications devices and signals received and transmitted, and other current and evolving technologies that a computerized system can interpret, receive, and/or transmit. The term "memory" includes any random access memory (RAM), read only memory (ROM), flash memory, integrated circuits, and/or other memory components or elements. The term "storage device" includes any solid state storage media, disk drives, diskettes, networked services, tape drives, and other storage devices. Memories and storage devices may store computer-executable instructions to be executed by a processing element and/or control logic, and data which is manipulated by a processing element and/or control logic. The term "data structure" is an extensible term referring to any data element, variable, data structure, database, and/or one or more organizational schemes that can be applied to data to facilitate interpreting the data or performing operations on it, such as, but not limited to memory locations or devices, sets, queues, trees, heaps, lists, linked lists, arrays, tables, pointers, etc. A data structure is typically maintained in a storage mechanism. The terms "pointer" and "link" are used generically herein to identify some mechanism for referencing or identifying another element, component, or other entity, and these may include, but are not limited to a reference to a memory or other storage mechanism or location therein, an index in a data structure, a value, etc.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the phrase "means for xxx" typically includes computer-readable medium containing computer-executable instructions for performing xxx.

In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Additionally, the use of a singular tense of a noun is non-limiting, with its use typically including one or more of the particular thing rather than just one (e.g., the use of the word "memory" typically refers to one or more memories without having to specify "memory or memories," or "one or more memories" or "at least one memory", etc.). Moreover, the phrases "based on x" and "in response to x" are used to indicate a minimum set of items x from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. The term "subset" is used to indicate a group of all or less than all of the elements of a set. The term "subtree" is used to indicate all or less than all of a tree. Moreover, the term "or" is used herein to identify a selection of one or more, including all, of the conjunctive items.

Disclosed are, inter alia, methods, apparatus, data structures, computer-readable media, mechanisms, and means for a storage controller (e.g., memory controller, disk controller, etc.) performing a set of multiple operations on cached data with a no-miss guarantee until the multiple operations are complete, which may, for example, be used by a packet processor to quickly update multiple statistics values (e.g., byte, packet, error counts, etc.) based on processed packets. In one embodiment, operations to be performed on data at the same address and/or in a common data structure are grouped together and burst so that they arrive at the storage system in contiguous succession for the storage controller to perform. By not allowing the storage controller to flush the data from its cache until all of the operations are performed, even a tiny cache attached to the storage controller can reduce the bandwidth and latency of updating the data.

One embodiment includes a storage and a storage controller. The storage controller includes a processing element and cache, with the cache including storage for one or more cache lines. The storage controller is configured to receive and process a batch command, which includes indications of multiple operations to be performed on data that can be stored in one or more cache lines. The storage controller is configured to retrieve the data into one or more particular cache lines of the cache from the storage in response to a cache miss for the batch command, and configured to perform all of the multiple operations before any other access request to the storage including another batch command such that the plurality of operations excluding the first operation are guaranteed to be performed without generating a cache miss.

In one embodiment, the cache miss for the batch command includes a cache miss operation in response to preparing to perform the first of the plurality of operations on the data. In one embodiment, at least one of the operations includes a read-modify-write operation. In one embodiment, the data can be stored in a single cache line, and the one or more particular cache lines consists of a single particular cache line. In one embodiment, the storage includes one or more memory devices and the storage controller includes a memory controller. In one embodiment, each of the plurality of operations manipulates a different subset of the data. In one embodiment, the storage controller is configured to receive the batch command from a packet processor, and the data corresponds to packet processing data. In one embodiment, the packet processing data includes a packet count and a byte count. In one embodiment, the storage controller is configured such that it must perform all of the plurality of operations included in the batch command after performing a first operation of the plurality of operations prior to performing any other operation on data stored in the cache memory. In one embodiment, the storage controller is configured to perform all operations indicated in the batch command prior to executing any operations indicated in a pending second batch command.

One embodiment includes one or more memory devices and a memory controller. The memory controller includes a processing element and cache, with the cache including storage for one or more cache lines. The memory controller is configured to receive and process a batch command, with the batch command including indications of multiple operations to perform on data that can be stored in a single cache line. The memory controller configured to retrieve the data into a particular cache line of the cache from the one or more memory devices in response to a cache miss for the batch command and configured to perform all of the multiple operations before performing any other operation that could cause the data to be flushed from the particular cache line such that the multiple operations excluding the first operation are guaranteed to be performed without generating a cache miss.

In one embodiment, the cache miss for the batch command includes a cache miss operation in response to preparing to perform the first of the multiple operations on the data. In one embodiment, at least one of the multiple operations includes a read-modify-write operation. In one embodiment, the other operations include another pending batch command. In one embodiment, the memory controller is configured to perform all operations indicated in a first batch command prior to executing any operations indicated in a pending second batch command. In one embodiment, the memory controller is configured to perform all of the multiple operations once it has retrieved the data into the particular cache line prior to performing another operation corresponding to a second set of data.

One embodiment includes a memory controller receiving a batch command with the batch command including indications of a multiple operations to modify data, the data storable in a single cache line. The memory controller recognizes based on the batch command that the data is not stored in a cache line of a cache memory associated with the memory controller and in response, the memory controller retrieves the data into a particular cache line of the memory controller from a memory. The memory controller performs each of the multiple operations on the data while stored in the particular cache line without retrieving the data again from the memory. The memory controller is prevented from flushing the data from the particular cache line after retrieving the data into the particular cache line until all of the multiple operations have been performed.

In one embodiment, the memory controller stores the data in the memory after the performing each of the multiple operations. In one embodiment, the storing of the data in the memory after the performing each of the multiple operations is performed in due course in response to aging of the particular cache line. In one embodiment, the storing of the data in the memory after the performing each of the multiple operations is performed in response to completing the performing each of the multiple operations, a completion of the batch command, or in response to a flush command. In one embodiment, the memory controller is configured such that it must perform all of the multiple operations included in the batch command after performing a first operation of the multiple operations prior to performing any other operation on data stored in the cache memory. In one embodiment, the memory controller is configured such that it must perform all of the multiple operations included in the batch command after performing a first operation of the multiple operations prior to retrieving any other data into the cache memory. In one embodiment, at least one of the multiple operations includes a read-modify-write operation. In one embodiment, each of the multiple operations manipulates a different subset of the data.

One embodiment includes one or more computer readable media for storing computer-executable instructions for performing steps by a memory controller. In one embodiment, these steps include identifying a batch command, the batch command including indications of a multiple operations to modify data, the data storable in a single cache line; recognizing based on the batch command that the data is not stored in a cache line of a cache memory associated with the memory controller and in response, retrieving the data into a particular cache line of the memory controller from a memory; and performing each of the multiple operations on the data while stored in the particular cache line without having to retrieve the data again from the memory; with the memory controller being prevented from flushing the data from the particular cache line after performing the retrieving the data into the particular cache line until all of the multiple operations have been performed.

In one embodiment, a memory controller receives a batch command, the batch command including indications of a multiple operations to modify multiple statistics values storable in one or more cache lines. The memory controller recognizes based on the batch command that the multiple statistics values are not stored in a cache memory associated with the memory controller and in response, the memory controller retrieves the multiple statistics values storable into the cache from a memory. The memory controller performs all of the multiple operations while the multiple statistic values remain stored in the cache without retrieving the multiple statistic values again from the memory. With the memory controller being prevented from flushing the multiple statistic values from the cache after performing the retrieving the multiple statistic values into the cache until all of the multiple operations have been performed.

In one embodiment, a memory controller identifies a batch command, the batch command includes indications of multiple operations to modify data, the data storable in a single cache line. The data is retrieved into a particular cache line of a cache memory associated with the memory controller if the data is not already in the particular cache line. Each of the multiple operations specified in the batch command are performed on the data while stored in the particular cache line prior to flushing said data from the particular cache line, retrieving any other data into the particular cache line, and prior to performing any other data manipulation operation on data stored in the particular cache line.

In one embodiment, a memory controller identifies a batch command, the batch command including indications of a plurality of operations to modify data, said data storable in a single cache line. The memory controller recognizes based on the batch command that the data is not stored in a cache line of a cache memory associated with the memory controller and in response, the data is retrieved into a particular cache line of the memory controller from a memory. Each of the operations are performed on the data while stored in the particular cache line prior to retrieving any other data into the particular cache line and prior to performing any other data manipulation operations on data stored in the particular cache line. In one embodiment, the memory controller is prevented from flushing said data from the particular cache line after performing said retrieving said data into the particular cache line until all of said plurality of operations have been performed.

In one embodiment, the multiple statistics values are retrieved into a single cache line of the cache, and all of the multiple operations are performed on the multiple statistics values in the single cache line before any of the multiple statistics values are flushed from the single cache line. In one embodiment, the memory controller is configured such that it must perform all of the multiple operations included in the batch command after performing a first operation of the multiple operations prior to performing any other operation on data stored in the cache. In one embodiment, the memory controller is configured such that it must perform all of the multiple operations included in the batch command after performing a first operation of the multiple operations prior to retrieving any other data into the cache. In one embodiment, at least one of the multiple operations includes a read-modify-write operation. In one embodiment, the batch command is received from a packet processor, and the multiple statistics include a byte or packet count.

In one embodiment, a memory controller receives a batch command, the batch command includes indications of multiple operations to modify multiple statistics values storable in a single cache line of a cache memory associated with the memory controller, the cache memory including multiple cache lines. The memory controller recognizes based on the batch command that the statistics values are not stored in the cache memory and in response, the memory controller retrieves the statistics values into the single cache line from a memory. The memory controller performs all of the operations while the statistic values remain stored in the single cache line without retrieving the statistic values again from the memory. The memory controller is prevented from flushing the statistic values from the single cache line after performing said retrieving the plurality of statistic values into the single cache line until after all of the operations have been performed and is prevented from performing any other data manipulation operation on data stored in the single cache line until after all of the operations have been performed.

FIG. 1A illustrates a storage subsystem 100 used in one embodiment. Shown is storage controller 101, which has some processing element for performing retrieval of data from storage 110 into cache 102, which includes one or more cache lines, and for performing operations on data retrieved to cache 102. These operations typically include atomic and other operations that typically use and modify such retrieved data (e.g., a read-modify-write operation), such as, but not limited to add a specified value, increment, decrement, logical operations (e.g., OR, AND, XOR, etc.), compare and swap, add two values, etc. Note, the term "storage" is a generic term indicating any type of storage, such as, but not limited to memory, disks, etc., and thus, for example, a memory controller is one type of a storage controller.

Multiple processing elements 120 submit batch commands 125 specifying the set of multiple operations to be performed on specified data. These batch commands 125 are typically sent to storage controller 101 in the form of a single message, although in one embodiment, a batch command 125 spans multiple messages. These operations are then performed by storage controller 101 on the specified data, with this data being retrieved into cache 102 if it is not already present. Embodiments then guarantee that this data corresponding to a batch command 125 will not be flushed from cache 102 until all operations specified in the batch command 125 are performed. Different embodiments may provide this guarantee in different ways. For example, one embodiment completely performs the batch command 125 before any other batch command. One embodiment completely performs the batch command 125 before any other data manipulation command. One embodiment performs the batch command 125 before retrieving any new data into cache 102. One embodiment performs the batch command 125 before flushing any data from cache 102. One embodiment effectively or actually locks the cache lines corresponding to the data corresponding to the batch command 125, and then unlocks them after the operations of the batch command are performed (and/or in response to specific lock and unlock operations in the batch command), which allows other operations (e.g., data retrieval, data flushing, data manipulation operations, etc.) to be performed by storage controller 101 concurrently with the batch command on other data.

Figure 1B:
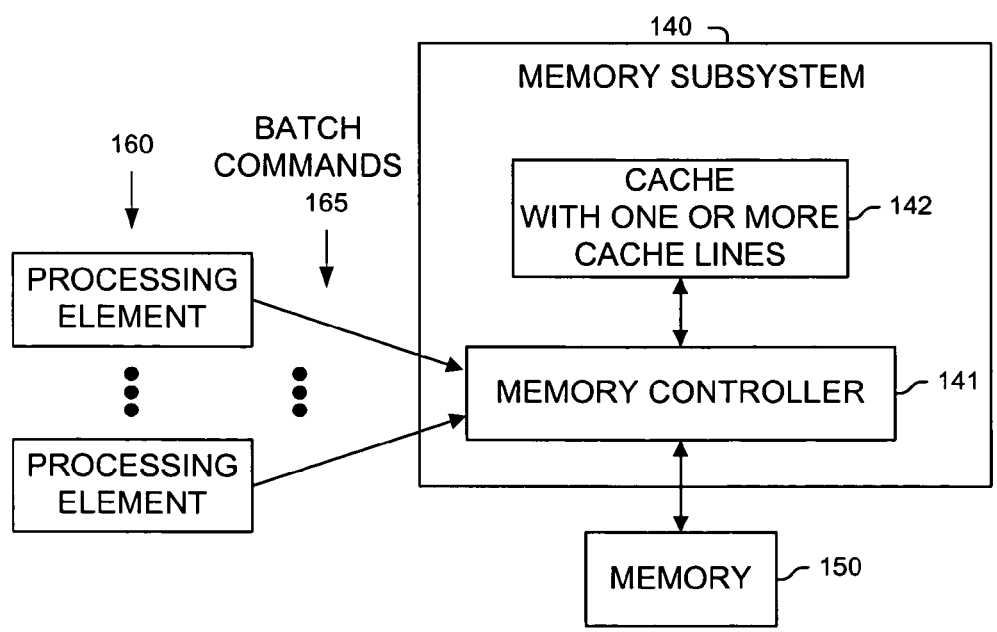
FIG. 1B is a block diagram of a memory system used in one embodiment.

FIG. 1B is a replica of FIG. 1A, but specifically refers to a memory subsystem 140, memory controller 141 and memory 150, with the teachings described in relation to FIG. 1A being applicable. FIG. 1B illustrates a memory subsystem 140 used in one embodiment. Shown is memory controller 141, which has some processing element for performing retrieval of data from memory 150 into cache 142, which includes one or more cache lines, and for performing operations on data retrieved to cache 142. These operations typically include atomic and other operations that typically use and modify such retrieved data (e.g., a read-modify-write operation), such as, but not limited to add a specified value, increment, decrement, logical operations (e.g., OR, AND, XOR, etc.), compare and swap, add two values, etc.

Multiple processing elements 160 submit batch commands 165 specifying the set of multiple operations to be performed on specified data. These batch commands 165 are typically sent to storage controller 101 in the form of a single message, although in one embodiment, a batch command 165 spans multiple messages. These operations are then performed by memory controller 141 on the specified data, with this data being retrieved into cache 142 if it is not already present. Embodiments then guarantee that this data corresponding to a batch command 165 will not be flushed from cache 142 until all operations specified in the batch command 165 are performed. Different embodiments may provide this guarantee in different ways. For example, one embodiment completely performs the batch command 165 before any other batch command. One embodiment completely performs the batch command 165 before any other data manipulation command. One embodiment performs the batch command 165 before retrieving any new data into cache 142. One embodiment performs the batch command 165 before flushing any data from cache 142. One embodiment effectively or actually locks the cache lines corresponding to the data corresponding to the batch command 165, and then unlocks them after the operations of the batch command are performed (and/or in response to specific lock and unlock operations in the batch command), which allows other operations (e.g., data retrieval, data flushing, data manipulation operations, etc.) to be performed by memory controller 141 concurrently with the batch command on other data.

Figure 2:
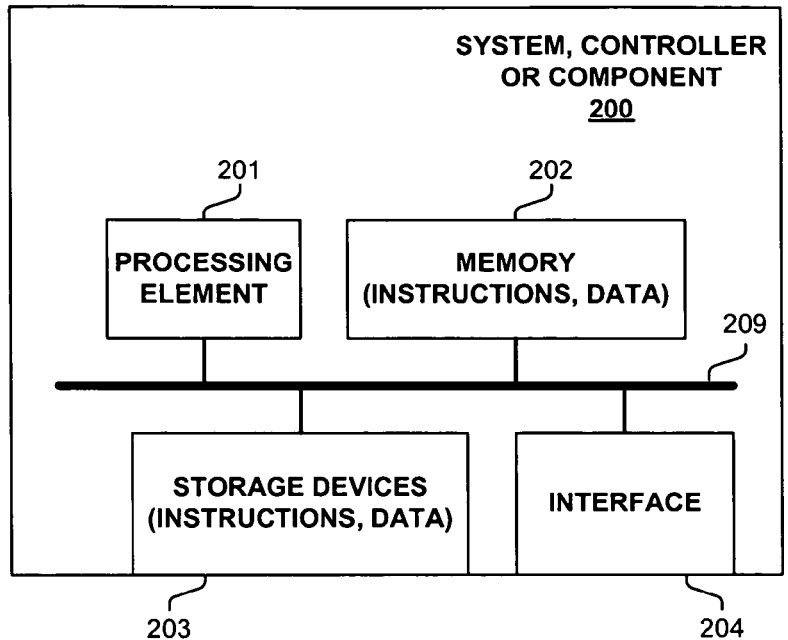
FIG. 2 is a block diagram of a system, controller, or component used in one embodiment.

FIG. 2 illustrates a system, controller, or component 200 used in one embodiment performing a set of multiple operations on cached data with a no-miss guarantee until the multiple operations are complete, which may, for example, be used by a packet processor to quickly update multiple statistics values (e.g., byte, packet, error counts, etc.) based on processed packets. In one embodiment, system or component 200 performs one or more processes corresponding to one of the flow diagrams illustrated or otherwise described herein.

In one embodiment, system, controller, or component 200 includes a processing element 201, memory 202, storage devices 203, an interface 204 for sending and receiving information/data items and/or communicating with external devices (e.g. processors, packet processors, computers, etc.), which are typically coupled via one or more communications mechanisms 209, with the communications paths typically tailored to meet the needs of the application. Various embodiments of system, controller, or component 200 may include more or less elements. The operation of system, controller, or component 200 is typically controlled by processing element 201 using memory 202 and storage devices 203 to perform one or more tasks or processes. Memory 202 is one type of computer-readable medium, and typically comprises random access memory (RAM), read only memory (ROM), flash memory, integrated circuits, and/or other memory components. Memory 202 typically stores computer-executable instructions to be executed by processing element 201 and/or data which is manipulated by processing element 201 for implementing functionality in accordance with an embodiment. Storage devices 203 are another type of computer-readable medium, and typically comprise solid state storage media, disk drives, diskettes, networked services, tape drives, and other storage devices. Storage devices 203 typically store computer-executable instructions to be executed by processing element 201 and/or data which is manipulated by processing element 201 for implementing functionality in accordance with an embodiment.

Figure 3A:
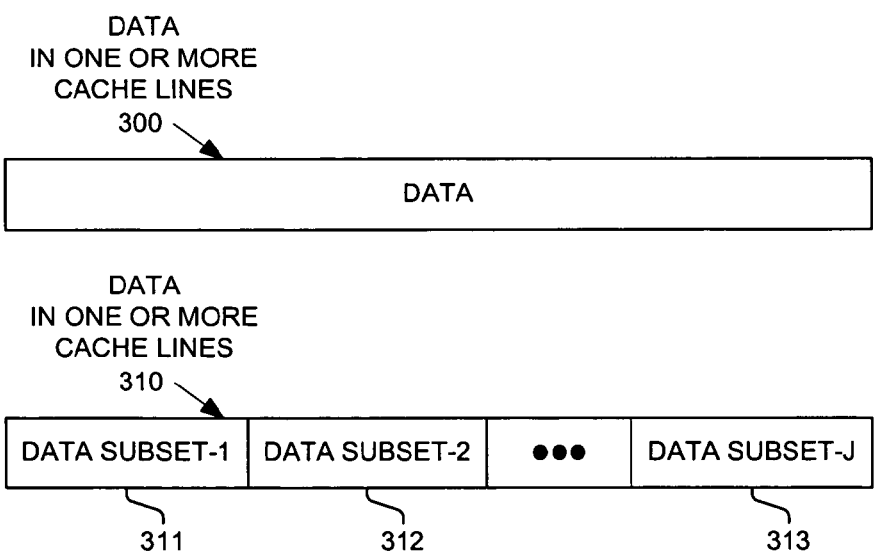
FIG. 3A are block diagrams illustrating data in one or more cache lines on which multiple operations are performed in one embodiment.

FIG. 3A illustrates data in one or more cache lines 300 and 310 on which multiple operations are performed in one embodiment. One or more cache lines 300 illustrate that the data can be operated on as a single unit; while one or more cache lines 310 illustrate that the data can be considered as subsets 311-313, with one or more subsets 311-313 manipulated by an operation of a batch command.

Figure 3B:
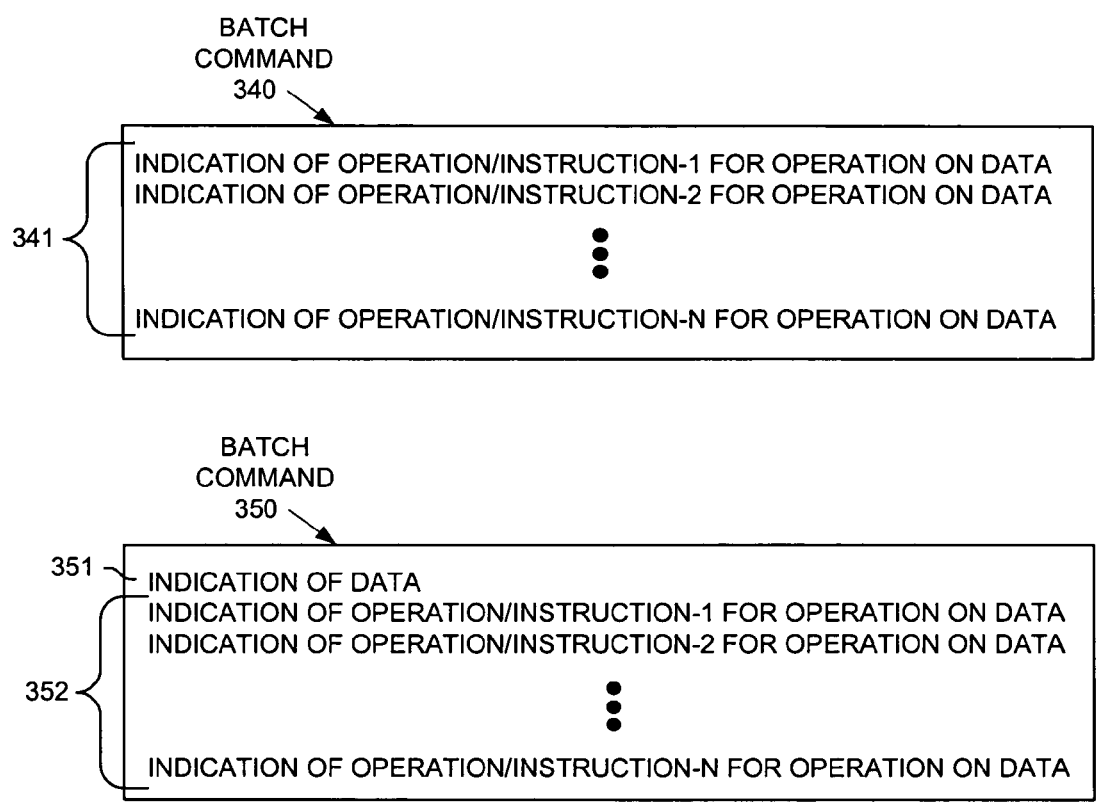
FIG. 3B are block diagrams illustrating batch commands identifying multiple operations used in one embodiment.

FIG. 3B illustrates batch commands 340 and 350 identifying multiple operations used in one embodiment. Batch command 340 includes indications 341 of multiple operations, with the data required by specified or inherent by these operations, and typically retrieved from storage based on the first of indications or operations. Batch command 350 specifically includes an indication 351 of the data to be manipulated by the operations specified by indications 352. Thus, for example, indication 351 of data may specify an address and possibly with a size, range of addresses, etc., which indicate to the storage controller the data to retrieve into its cache with the guarantee that such data will not be flushed from the cache until all operations associated with the batch command are complete.

Figure 4:
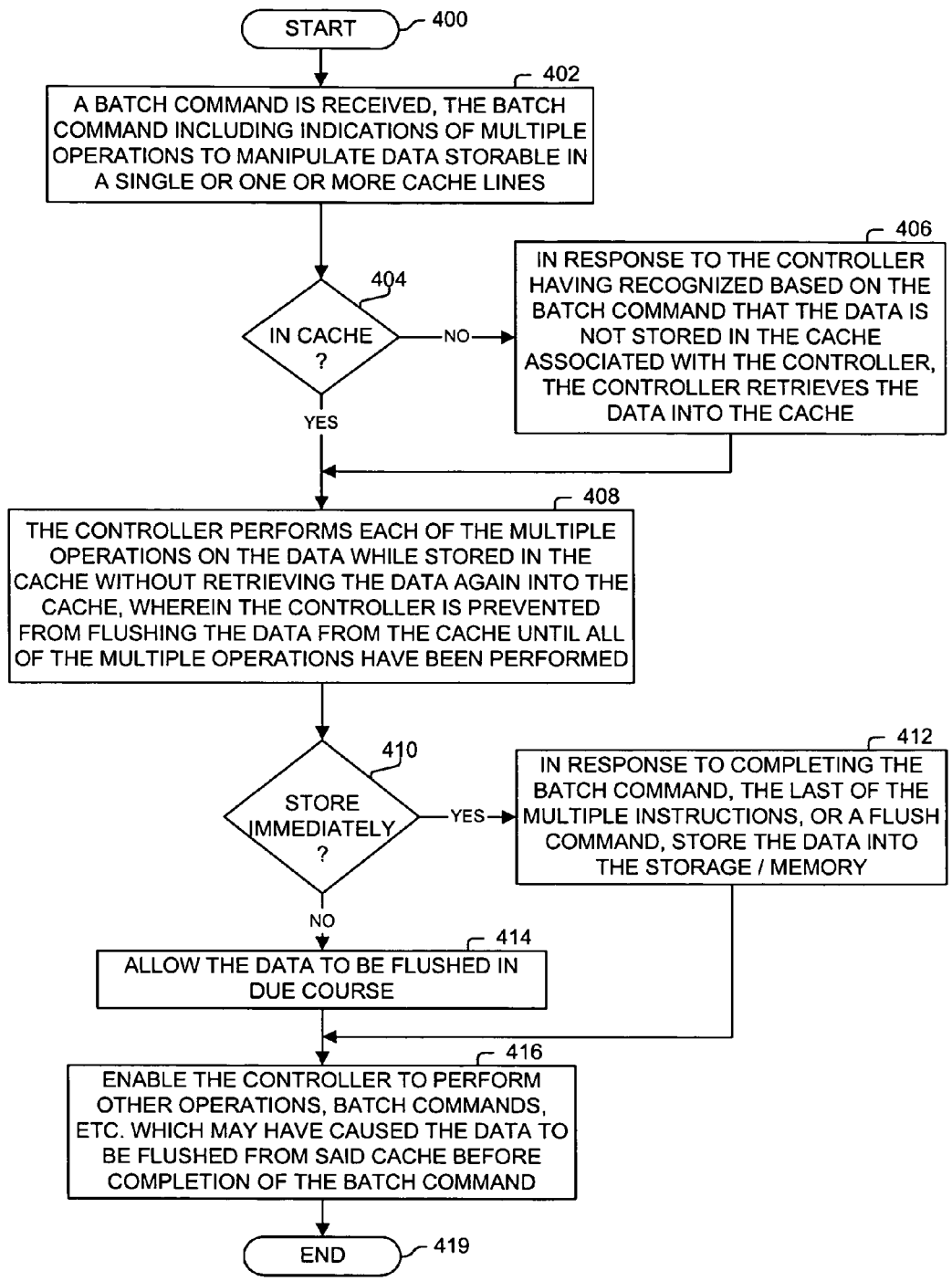
FIG. 4 is a flow diagram illustrating a process for performing multiple operations by a storage controller with a no-miss guarantee used in one embodiment.

FIG. 4 illustrates a process for performing multiple operations by a storage controller with a no-miss guarantee used in one embodiment. Processing begins with process block 400, and proceeds to process block 402, wherein a batch command is received, with the batch command including indications of multiple operations to manipulate data storable in a single or multiple cache lines. As determined in process block 404, if the data is not already in the cache, then in process block 406 in response to the controller having recognized based on the batch command that the data is not stored in the cache associated with the controller, the controller retrieves the data into the cache.

In process block 408, the controller performs each of the multiple operations on the data while stored in the cache without retrieving the data again into the cache, wherein the controller is prevented from flushing the data from the cache until all of the multiple operations have been performed. As determined in process block 410, if the data is to be written immediately back to storage, then in process block 412, in response to completing the batch command, the last of the multiple instructions, or a flush command, the data is stored in the storage. Otherwise, as indicated by process block 414, the data is allowed to be flushed in due course (e.g., based on an aging or other caching mechanism employed by the controller). As indicated by process block 416, as all of the operations associated with the batch command have been performed, the controller is enabled to perform other operations, batch commands, etc. which may have caused the data to be flushed from the cache before the batch command was completed. Processing is complete as indicated by process block 419.

Figure 5A:
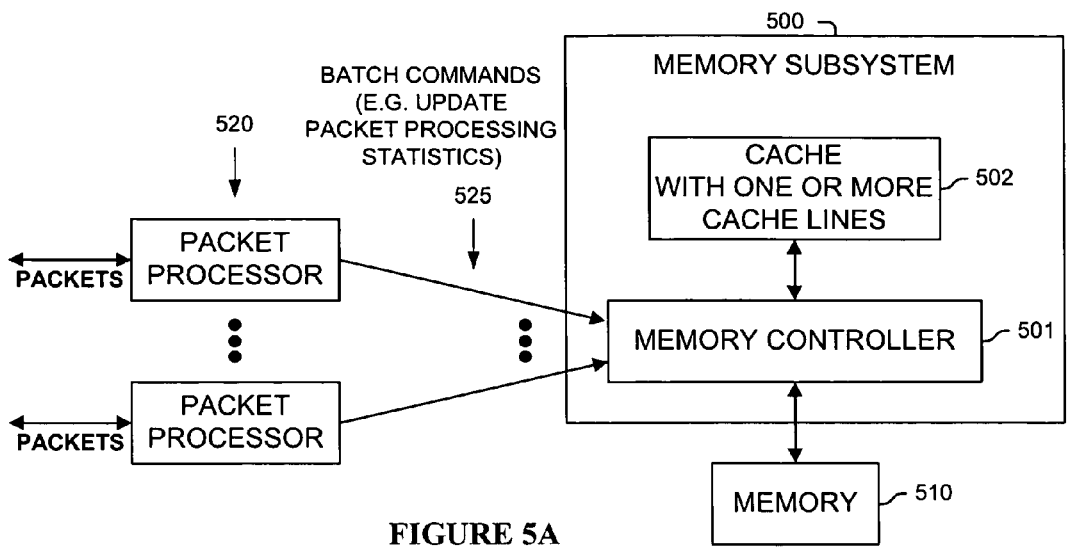
FIG. 5A is a block diagram of a memory system used in one embodiment to update multiple statistics.

FIG. 5A illustrates a memory subsystem 501 used in one embodiment to specifically configured to perform batch commands, including updating packet statistics stored in memory 510. Packet processors 520 process packets. In doing so, many different statistics are generated, such as, but not limited to packet counts, byte counts, error counts, protocol usage, and a whole host of other statistics which are generated via well-known mechanisms and thus will not be repeated herein. Packet processors 520 generate batch commands 525 to update the packet processing statistics (e.g., packet, byte, protocol, error counts, etc.). In response, memory controller 501 retrieves the corresponding data from memory 510 into cache 502, and performs the specified updates to the statistics.

Figure 5B:
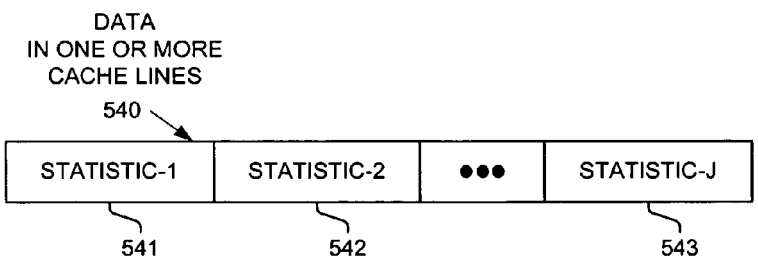
FIG. 5B is block diagrams illustrating data in one or more cache lines on which multiple operations are performed to update multiple statistics in one embodiment.

FIG. 5B illustrates data 540 stored in one or more cache lines, with the data representing multiple statistics values 541-543. Retrieving this data into cache and guaranteeing that the multiple operations can be performed by memory controller 501 (or other storage controller in another embodiment) on this data 540 before it is flushed from cache 502, guarantees a high performance as no caching delays other than the first one will be incurred (which can be compared with multiple independent update operations which each typically incur a cache miss).

Figure 5C:
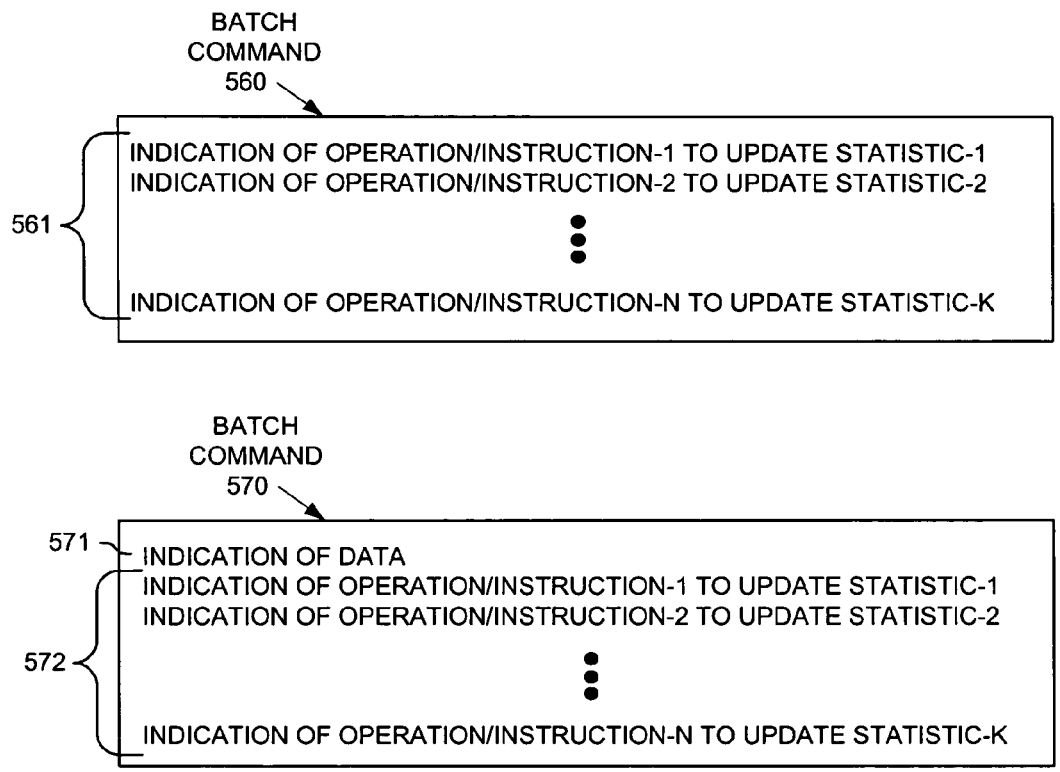
FIG. 5C is a block diagram illustrating batch commands identifying multiple operations to update statistics used in one embodiment.

FIG. 5C illustrates batch commands 560 and 570 used in one embodiment to update statistics. Batch command 560 includes indications 561 of multiple operations to manipulate statistics, with the data required by specified or inherent by these operations, and typically retrieved from storage based on the first of indications or operations. Batch command 570 specifically includes an indication 571 of the data to be manipulated by the operations specified by indications 572. Thus, for example, indication 571 of data may specify an address and possibly with a size, range of addresses, etc., which indicate to the storage controller the data to retrieve into its cache with the guarantee that such data will not be flushed from the cache until all operations associated with the batch command are complete.

Figure 5D:
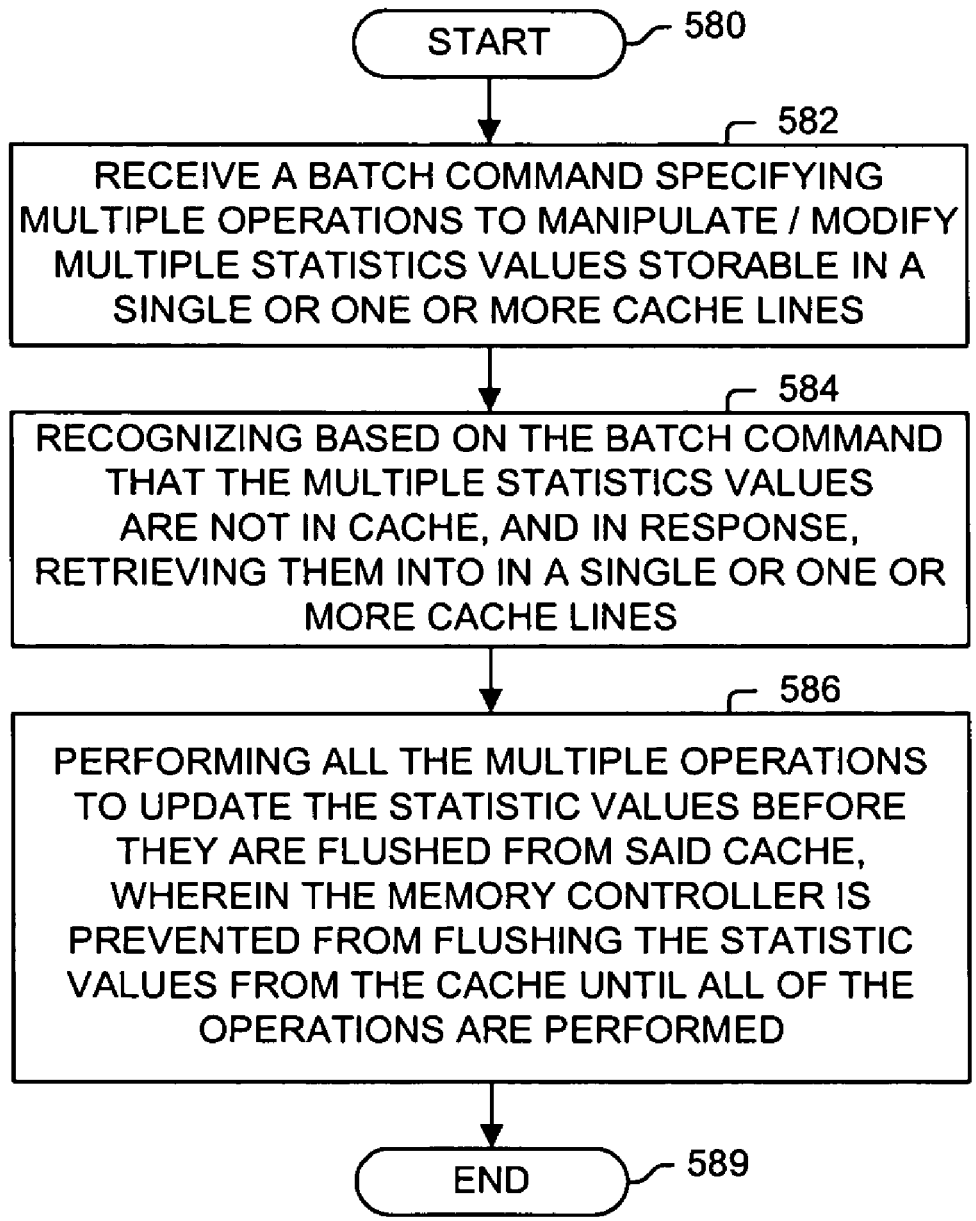
FIG. 5D is a flow diagram illustrating a process for performing multiple statistics update operations by a memory controller with a no-miss guarantee used in one embodiment.

FIG. 5D illustrates a process for performing multiple statistics update operations by a memory controller with a no-miss guarantee used in one embodiment. Processing begins with process block 580, and proceeds to process block 582, wherein the memory controller receives a batch command identifying multiple operations to manipulate multiple statistics values storable in a single or multiple caches lines. In process block 584, in response to the controller having recognized based on the batch command that the data is not stored in the cache associated with the controller, the controller retrieves the data into the cache. In process block 586, all of the multiple operations are performed to manipulate the statistic values before they are flushed from the cache, wherein the memory controller is prevented from flushing them from the cache until all of the operations are performed. Processing is complete as indicate by process block 589.

In view of the many possible embodiments to which the principles of our invention may be applied, it will be appreciated that the embodiments and aspects thereof described herein with respect to the drawings/figures are only illustrative and should not be taken as limiting the scope of the invention. For example and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. An apparatus, comprising:
   storage; and
   a storage controller including a processing element and cache, said cache including storage for a plurality of cache lines;
   wherein the storage controller is configured to receive and process a batch command, the batch command including an ordered list of a plurality of operations to be serially performed on data that can be stored in the plurality of cache lines;
   wherein the storage controller is configured to retrieve an initial value of said data into a plurality of particular cache lines of the plurality of cache lines of said cache from said storage in response to a cache miss for the batch command, and is configured to serially perform all of the plurality of operations on said data stored in the plurality of particular cache lines before performing any other access request to said storage, including another batch command, such that the plurality of operations excluding the first operation are guaranteed to be performed without generating a cache miss; and
   wherein the plurality of operations include reading at least a portion of said data from the plurality of particular cache lines, and subsequently storing at least one value in said data in the plurality of particular cache lines.

2. The apparatus of claim 1, wherein the cache miss for the batch command includes a cache miss operation in response to preparing to perform the first of the plurality of operations on said data.

3. The apparatus of claim 1, wherein a particular one of the plurality of operations is a read-modify-write operation.

4. The apparatus of claim 3, wherein each of at least two of the plurality of operations is a read-modify-write operation.

5. The apparatus of claim 1, wherein said storage includes one or more memory devices and said storage controller includes a memory controller.

6. The apparatus of claim 1, wherein each of the plurality of operations manipulates a different subset of said data.

7. The apparatus of claim 1, wherein the storage controller is configured to receive the batch command from a packet processor, and said data corresponds to packet processing data.

8. The apparatus of claim 7, wherein said packet processing data includes a packet count and a byte count.

9. The apparatus of claim 1, wherein the storage controller is configured such that it must perform all of the plurality of operations included in the batch command after performing a first operation of the plurality of operations prior to performing any other operation on data stored in the cache memory.

10. The apparatus of claim 1, wherein the storage controller is configured to perform all operations indicated in the batch command prior to executing any operations indicated in a pending second batch command including a second ordered list of operations to perform.

11. The apparatus of claim 1, wherein the plurality of operations includes at least three operations.

12. The apparatus of claim 11, wherein the plurality of operations includes at least four operations.

13. An apparatus, comprising:
one or more memory devices; and
a memory controller including a processing element and cache, said cache including storage for a plurality of cache lines;
wherein the memory controller is configured to receive and process a batch command, the batch command including an ordered list of a plurality of operations to be serially performed on data that can be stored in the plurality of cache lines;
wherein the memory controller is configured to retrieve an initial value of said data into a particular plurality of the plurality of cache lines of said cache from said one or more memory devices in response to a cache miss for the batch command, and is configured to serially perform all of the plurality of operations on said data stored in the particular plurality of cache lines before performing any other operation that could cause said data to be flushed from the particular plurality of cache lines such that the plurality of operations excluding the first operation are guaranteed to be performed without generating a cache miss; and
wherein the plurality of operations include reading at least a portion of said data from the particular plurality of cache lines, and subsequently storing at least one value in said data in the particular plurality of cache lines.

14. The apparatus of claim 13, wherein the cache miss for the batch command includes a cache miss operation in response to preparing to perform the first of the plurality of operations on said data.

15. The apparatus of claim 13, wherein a particular one of the plurality of operations is a read-modify-write operation.

16. The apparatus of claim 13, wherein said other operations include another pending batch command.

17. The apparatus of claim 13, wherein the memory controller is configured to perform all operations indicated in a first batch command prior to executing any operations indicated in a pending second batch command including a second ordered list of operations to perform.

18. The apparatus of claim 13, wherein the memory controller is configured to perform all of the plurality of operations once it has retrieved said data into the particular plurality of cache lines prior to performing another operation corresponding to a second set of data.

19. The apparatus of claim 13, wherein the memory controller is configured to perform all of the plurality of operations once it has retrieved said data into the particular plurality of cache lines prior to performing another operation from: a second batch command including a second ordered list of operations to perform, or other memory request on said data in the particular plurality of cache lines.

20. The apparatus of claim 13, wherein the plurality of operations includes at least three operations.

21. The apparatus of claim 20, wherein the plurality of operations includes at least four operations.

22. A method comprising:
a memory controller receiving a batch command, the batch command including an ordered list of a plurality of operations to modify data, with said data storable in a plurality of cache lines;
the memory controller recognizing, based on the batch command, that the data is not stored in the plurality of cache lines of a cache memory associated with the memory controller, and in response, the memory controller retrieving an initial value of said data into the plurality of cache lines of the memory controller from a memory; and
the memory controller serially performing each of the plurality of operations on said data while stored in the plurality of cache lines without retrieving said data again from the memory;
wherein the memory controller is prevented from flushing said data from the plurality of cache lines after performing said retrieving said data into the plurality of cache lines until all of said plurality of operations have been performed; and
wherein the plurality of operations include reading at least a portion of said data from the plurality of cache lines and subsequently storing at least one value in said data in the plurality of cache lines.

23. The method of claim 22, comprising the memory controller storing said data in the memory after said performing each of the plurality of operations.

24. The method of claim 23, wherein said storing said data in the memory after said performing each of the plurality of operations is performed in response to aging of the particular cache line.

25. The method of claim 23, wherein said storing said data in the memory after said performing each of the plurality of operations is performed in response to completing said performing each of the plurality of operations, a completion of the batch command, or in response to a flush command.

26. The method of claim 22, wherein the memory controller is configured such that it must perform all of the plurality of operations included in the batch command after performing a first operation of the plurality of operations prior to performing any other operation on data stored in the cache memory.

27. The method of claim 22, wherein the memory controller is configured such that it must perform all of the plurality of operations included in the batch command after performing a first operation of the plurality of operations prior to retrieving any other data into the cache memory.

28. The method of claim 22, wherein a particular one of the plurality of operations is a read-modify-write operation.

29. The method of claim 28, wherein each of at least two of the plurality of operations is a read-modify-write operation.

30. The method of claim 22, wherein each of the plurality of operations manipulates a different subset of said data.

31. An apparatus comprising:
- means for recognizing, based on a batch command, that corresponding data is not stored in a cache memory, and in response, retrieving an initial value of said data into a plurality of particular cache lines of the cache memory from storage, with the batch command including an ordered list of a plurality of operations to modify said data; and
- means for serially performing each of the plurality of operations on said data while stored in the plurality of particular cache lines without retrieving said data again from said storage;
- wherein said data is prevented from being flushed from the plurality of particular cache lines after performing said retrieving said data into the plurality of particular cache lines until all of said plurality of operations have been performed; and
- wherein the plurality of operations include reading at least a portion of said data from the plurality of particular cache lines and subsequently storing at least one value in said data in the plurality of particular cache lines.

32. The apparatus of claim 31, wherein said means for serially performing each of the plurality of operations is configured such that all of the plurality of operations included in the batch command after performing a first operation of the plurality of operations must be performed prior to performing any other operation on data stored in the cache memory.

33. The apparatus of claim 31, wherein said means for serially performing each of the plurality of operations is configured such that all of the plurality of operations included in the batch command after performing a first operation of the plurality of operations must be performed prior to retrieving any other data into the cache memory.

34. The apparatus of claim 31, wherein a particular one of the plurality of operations is a read-modify-write operation.

35. A memory controller comprising one or more processors and instruction memory, wherein said instruction memory stores one or more instructions that, when executed by the one or more processors, perform the operations of:
- recognizing, based on a batch command, that corresponding data is not stored in a plurality of cache lines of a cache memory associated with the memory controller, and in response, retrieving an initial value of said data into a particular plurality of cache lines of the plurality of cache lines of the memory controller from a memory, with the batch command including an ordered list of a plurality of operations to modify said data; and
- serially performing each of the plurality of operations on said data while stored in the particular plurality of cache lines without having to retrieve said data again from the memory;
- wherein the memory controller is prevented from flushing said data from the particular plurality of cache lines after performing said retrieving said data into the particular plurality of cache lines until all of said plurality of operations have been performed; and
- wherein the plurality of operations include reading at least a portion of said data from the particular plurality of cache lines and subsequently storing at least one value in said data in the particular plurality of cache lines.

36. A memory controller comprising one or more processors and instruction memory, wherein said instruction memory stores one or more instructions that, when executed by the one or more processors, perform the operations of:
- recognizing, based on a batch command, that corresponding data is not stored in a plurality of cache lines of a cache memory associated with the memory controller, and in response, retrieving an initial value of said data into a particular plurality of cache lines of the plurality of cache lines of the memory controller from a memory, with the batch command including an ordered list of a plurality of operations to modify said data; and
- serially performing each of the plurality of operations on said data while stored in the particular plurality of cache lines prior to retrieving any other data into the particular plurality of cache lines and prior to performing any other data manipulation operations on data stored in the particular plurality of cache lines; and
- wherein the plurality of operations include reading at least a portion of said data from the particular plurality of cache lines and subsequently storing at least one value in said data in the particular plurality of cache lines.

37. A method performed by a memory controller, the method comprising:
- recognizing, based on a batch command, that corresponding data is not stored in a cache line of a cache memory associated with the memory controller, and in response, retrieving an initial value of said data into a particular plurality of cache lines of the memory controller from a memory, with the batch command including an ordered list of a plurality of operations to modify said data; and
- serially performing each of the plurality of operations on said data while stored in the particular plurality of cache lines prior to retrieving any other data into the particular plurality of cache lines and prior to performing any other data manipulation operations on data stored in the particular plurality of cache lines;
- wherein the memory controller is prevented from flushing said data from the particular plurality of cache lines after performing said retrieving said data into the particular plurality of cache lines until all of said plurality of operations have been performed; and
- wherein the plurality of operations include reading at least a portion of said data from the particular plurality of cache lines and subsequently storing at least one value in said data in the particular plurality of cache lines.

38. A method comprising:
- a memory controller receiving a batch command, the batch command including an ordered list of a plurality of operations to modify a plurality of statistics values storable in a plurality of cache lines of a cache memory associated with the memory controller;
- the memory controller recognizing based on the batch command that the plurality of statistics values are not stored in the cache memory, and in response, the memory controller retrieving initial values of the plurality of statistics values into the plurality of cache lines from a memory; and
- the memory controller serially performing all of the plurality of operations while the plurality of statistic values remain stored in the cache without retrieving the plurality of statistic values again from the memory;
- wherein the memory controller is prevented from flushing the plurality of statistic values from the cache after performing said retrieving the plurality of statistic values into the cache until all of said plurality of operations have been performed; and
- wherein the plurality of operations include reading at least one of the plurality of statistics values from the cache and subsequently storing an updated value of said at least one of the plurality of statistics values in the cache.

39. The method of claim 38, wherein the memory controller is configured such that it must perform all of the plurality of operations included in the batch command after performing a first operation of the plurality of operations prior to performing any other operation on data stored in said cache.

40. The method of claim 38, wherein the memory controller is configured such that it must perform all of the plurality of operations included in the batch command after performing a first operation of the plurality of operations prior to retrieving any other data into said cache.

41. The method of claim 38, wherein a particular one of the plurality of operations is a read-modify-write operation.

42. The method of claim 38, wherein the batch command is received from a packet processor, and the plurality of statistics include a byte or packet count.

43. A method comprising:

a memory controller receiving a batch command, the batch command including an ordered list of a plurality of operations to modify a plurality of statistics values storable in a plurality of cache lines of a cache memory associated with the memory controller;

the memory controller recognizing based on the batch command that the plurality of statistics values are not stored in the cache memory, and in response, the memory controller retrieving initial values of the plurality of statistics values into the plurality of cache lines from a memory; and the memory controller serially performing all of the plurality of operations while the plurality of statistic values remain stored in the plurality of cache lines without retrieving the plurality of statistic values again from the memory;

wherein the memory controller is prevented from flushing the plurality of statistic values from the plurality of cache lines after performing said retrieving the plurality of statistic values into the plurality of cache lines until after all of said plurality of operations have been performed and prevented from performing any other data manipulation operation on data stored in the plurality of cache lines until after all of said plurality of operations have been performed; and wherein the plurality of operations include reading at least one of the plurality of statistics values from the plurality of cache lines and subsequently storing an updated value of said at least one of the plurality of statistics values in the plurality of cache lines.

* * * * *